United States Patent [19]

Roberts

[11] Patent Number: 5,384,375
[45] Date of Patent: Jan. 24, 1995

[54] UREA DERIVATIVES OF MALEATED POLYOLEFINS

[75] Inventor: Thomas D. Roberts, Longview, Tex.

[73] Assignee: Eastman Kodak Company, Kingsport, Tenn.

[21] Appl. No.: 203,138

[22] Filed: Feb. 28, 1994

[51] Int. Cl.$^6$ ............................................. C08F 8/30
[52] U.S. Cl. ................................. 525/327.6; 525/285; 525/374
[58] Field of Search ...................... 525/327.6

[56] References Cited

U.S. PATENT DOCUMENTS

| | | |
|---|---|---|
| 4,039,560 | 8/1977 | Tomoshige . |
| 5,068,047 | 11/1991 | Chung et al. ............... 525/327.6 |
| 5,241,003 | 8/1993 | Degonia et al. ............. 525/327.6 |
| 5,296,560 | 3/1994 | Gutierrez et al. ............ 525/327.6 |
| 5,312,556 | 5/1994 | Chung et al. ............... 525/327.6 |

OTHER PUBLICATIONS

N. C. Liu, H. Q. Xie and W. E. Baker, Polymer, vol. 34, (#22) pp. 4680–4687 (1993).

Primary Examiner—Bernard Lipman
Attorney, Agent, or Firm—Mark A. Montgomery; Harry J. Gwinnell

[57] ABSTRACT

Compositions are disclosed that are the urea derivatives of succinylated polyolefins (maleated polyolefins). The urea derivatives of succinylated polyolefins are of the formula;

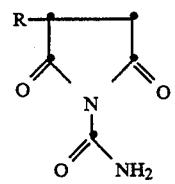

wherein R is a polyolefin attached at any point along the hydrocarbon chain. The urea derivative of succinylated polyolefins is useful as a coupling agent to couple polyolefins with dissimilar polymers having an excess of unreacted acid groups such as polyesters.

5 Claims, No Drawings

UREA DERIVATIVES OF MALEATED POLYOLEFINS

FIELD OF THE INVENTION

This invention relates to novel non-crosslinked urea derivatives of polyolefins and process for the production thereof.

BACKGROUND OF THE INVENTION

Polymers of many different types have been known for many years and have a wide variety of uses. A blend of two or more different polymers each having different properties can increase the applications available to polymers when compared to only unblended polymers. However, blends of polymers that are very dissimilar are, in some instances, not possible due to compatibility problems which prevent the formation of a homogeneous blend. Heterogeneous mixtures of polymers are usually not very useful blends due to phase separation problems during processing detracting from strength and processing properties.

Coupling reagents, also known as compatibilizers, can be polymers containing reactive groups which can form chemical bonds to dissimilar polymers. Thus the reactive group may cause formation of an AB block copolymer which is compatible with both dissimilar polymers. For example a two-phase heterogeneous mixture of polypropylene and some nylons can be made compatible by adding maleated polypropylene. Unreacted amine groups (base) on the nylon react with the succinyl anhydride groups (acid) on the maleated polypropylene to form cyclic imides. The AB block copolymer thus formed contains one block of polypropylene chemically bonded via the imide ring to one block of nylon. Such AB block copolymers serve as compatibilizers for polypropylene and nylon.

The above reaction to form an AB block copolymer is an acid/base (anhydride group/amine group) reaction and works well for attachment of polypropylene to polymers with an excess of unreacted base groups such as amines. However, it is not currently possible to economically couple a polyolefin such as polypropylene to polymers with an excess of unreacted acid groups, such as carboxylic acid groups. See N. C. Liu, H. Q. Xie and W. E. Baker, POLYMER, vol. 34, (#22) page 4680-4687 (1993) for examples of using expensive amines to couple acidic polymers. An attempt to produce this type of coupling agent that would be economical and useful in coupling polyolefins to such polymers involved reacting a diamine (ethylene diamine) with a maleated polyolefin (maleated polypropylene) to provide a polymer having imide rings and unreacted amine groups that could then be available for reacting with polymers containing unreacted acid groups. However, the attempt to produce this coupling agent produced a crosslinked material that was useless as a coupling agent.

U.S. Pat. No. 4,039,560 also tends to infer this result disclosing urea as a cross-linking agent for cellulosics.

In light of the above it would be very desirable to be able to produce a useful non-crosslinked compatibilizing agent or coupling agent that would permit the coupling of polyolefins with polymers containing an excess of unreacted acid groups.

SUMMARY OF THE INVENTION

The composition according to the present invention comprises the urea derivative of succinylated polyolefins of the formula;

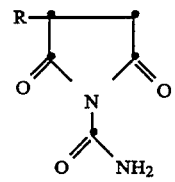

wherein R is a polyolefin attached at any point along the hydrocarbon chain.

The process for the production of the urea derivative of succinylated polyolefins according to the present invention comprises;

(I) melt mixing urea with a succinylated polyolefin of the formula;

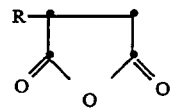

wherein R is a polyolefin and the anhydride group is attached at any point along the hydrocarbon chain and wherein the molar concentration of said urea is about equal to the molar equivalence of the succinylate group on the succinylated polyolefin; and (II) cooling the recovered urea derivative of succinylated polyolefin.

The present invention further comprises an emulsion composition containing about 10 to 30 weight percent of the urea derivative of succinylated polyolefin, a minor amount up to 15 weight percent surfactant, and water.

DETAILED DESCRIPTION OF THE INVENTION

The applicant has unexpectedly discovered a novel inexpensive coupling agent that is a urea derivative of succinylated polyolefin. This composition is unexpectedly produced and does not form a crosslinked product as suggested in the prior art (as noted above). Additionally, this composition is unexpected since the reaction of a succinylated polyolefin with a diamine, as discussed in the background above and in comparative examples 5 and 6 below, produced a crosslinked product. This reaction is illustrated below in Scheme 1. The desired product that was not produced is composition A.

Scheme 1

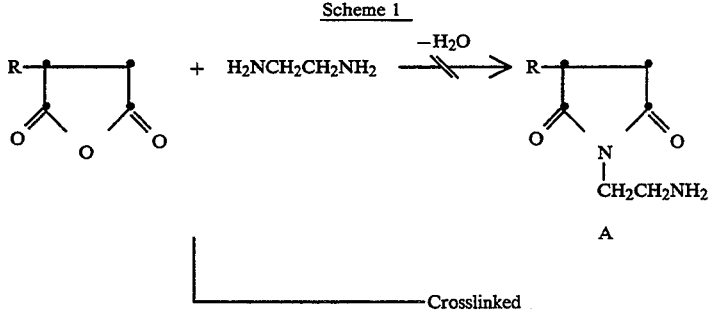

Crosslinked

The composition according to the present invention is a non-crosslinked urea derivative of succinylated polyolefin (Composition B) and is produced according to the following scheme:

Scheme 2

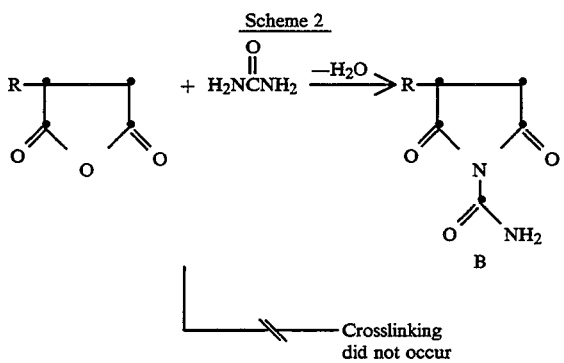

Crosslinking did not occur

In the above schemes 1 and 2, R represents a polyolefin attached at any point along the hydrocarbon chain to the succinylate group or anhydride group (used interchangeably herein). Thus, the composition according to the present invention comprises the urea derivative of succinylated polyolefins of the above formula, wherein R is a polyolefin attached at any point along the hydrocarbon chain to the anhydride group. The succinylated polyolefin is prepared by reacting the polyolefin with maleic anhydride.

Preferred succinylated polyolefins that are used to prepare the urea derivative of succinylated polyolefin are selected from the group consisting of maleated homopolypropylene; maleated homopolyethylene; maleated copolymers of propylene and up to 50 weight percent of at least one other olefin selected from the group consisting of ethylene, butene, hexene, and mixtures thereof; and maleated copolymers of ethylene and up to 50 weight percent of at least one other olefin selected from the group consisting of propylene, butene, hexene, and mixtures thereof. Maleated polypropylene and maleated polyethylene are more preferred due to ready availability.

Suitable examples of maleated polypropylene wax are maleated polypropylene waxes with a viscosity less than 2,000 cP at 190° C. Another suitable example of a maleated polypropylene is a maleate amorphous polypropylene with a melt viscosity of less than 10,000 cP at 190° C.

The emulsion composition according to the present invention comprises
(a) about 10 to 30 weight percent of the urea derivative of succinylated polyolefins disclosed above,
(b) a minor amount up to 15 weight percent of a surfactant, and
(c) about 60 to 90 weight percent water.

The emulsion composition according to the present invention contains about 10 to 30 weight percent of the urea derivative of succinylated polyolefin, preferably 17 to 27 weight percent, with a weight percent of urea derivative of succinylated polyolefin of about 21 to 23 weight percent being most preferred. Amounts of urea derivative much above 30 weight percent and much below 10 weight percent are not as emulsifiable.

The amount of surfactant used in the emulsion composition of the present invention can be a minor amount to as high as 15 weight percent but is preferably about 3 to 15 weight percent, more preferably 5 to 10 weight percent with a weight percent of surfactant of about 6 to 8 being most preferred. Amounts of surfactant much over 15 weight percent are not needed to render the amount of urea derivative dispersible in the water. However, minor amounts such as those well below 3 weight percent do not adequately disperse a significant amount of urea derivative in water. Examples of suitable surfactants include ethoxylated nonophenols such as Igepal CO-630 and Igepal CO-710 from Ciba/Geigy and ethoxylated alcohols such as Tergitol 15-S-9 and Tergitol 15-S-12 from Union Carbide.

The amount of water used in the emulsion composition according to the present invention varies depending upon the desired concentration and can be calculated after adding the urea derivative of succinylated polyolefin and surfactant such that the total equals 100 weight percent. This amount of water is generally between 60 and 90 weight percent, preferably between 70 and 80 weight percent with a weight percent of water of about 73 to 79 being most preferred.

A base is preferably added to the emulsion to render the aqueous solution basic. Amounts of base range from 1 to 3 weight percent, preferably 0.75 to 1.5 weight percent, preferably 0.8 to 1.2 weight percent with a weight percent of base of about 1 percent being most preferred. Examples of suitable bases include amines, sodium hydroxide, and potassium hydroxide.

The emulsion composition according to the present invention can also contain other ingredients such as bleaching agents or whitening agents such as sodium metabisulfate in concentrations as high as 0.34 weight percent. The bleaching agent is preferably present at the concentration of at least 0.1, more preferably at least 0.15 with an amount of bleaching agent of about 0.29 to 0.31 being most preferred.

The urea derivative of succinylated polyolefins is useful when coupled with another polymer and thus forms a coupled polymer composition of the formula;

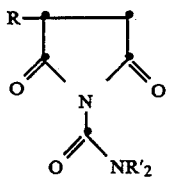

wherein R is a polyolefin and the anhydride group is attached at any point along the hydrocarbon chain and wherein R' is selected from the group consisting of hydrogen or the residue of said polymer with at least one R' being said residue of said polymer.

The unreacted amine group from the urea derivative of succinylated polyolefin is available to react with the polar polymer so as to produce the coupled residue. This is generally conducted by mixing the polymer, containing unreacted acid groups, into the emulsion of the urea derivative of succinylated polyolefin.

Suitable examples of the polymer that forms the residue of the polymer in the coupled composition include polyesters, polycarbonates, polyacrylic acids, and nylon.

The process for the production of the urea derivative of the succinylated polyolefins comprises;

(I) melt mixing urea with a succinylated polyolefin of the formula;

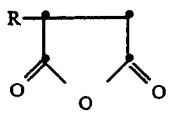

wherein R is a polyolefin and the anhydride group is attached at any point along the hydrocarbon chain and wherein the molar concentration of said urea is about equal to the molar equivalence of the succinylate group on the succinylated polyolefin; and (II) cooling the recovered urea derivative of succinylated polyolefin.

The amount of urea used in the process according to the present invention is in a molar ratio of urea to succinylate group and is preferably about 0.1 to 2, more preferably about 0.5 to 1, with a molar ratio of about 1 being most preferred. Lower levels of urea below the equivalent of anhydride group are clearly contemplated depending upon the amount of incorporation of urea desired. Amounts of urea much above 1 equivalent of urea to anhydride group simply wastes urea and leaves unreacted urea in the final product, however higher amounts may be desired to increase the reaction rate and reduce reaction time.

The process for the production of the urea derivative of succinylated polyolefins is preferably conducted above the melting point of the succinylated polyolefin yet preferably below 200° C. This temperature is preferably about 165° to 190° C., more preferably about 175° to 185° C. with a temperature of about 180° C. being most preferred. At temperatures much below 165° C. some maleated polyolefins will not exist in the molten form; whereas temperatures much above 200° C. will contribute to slow decomposition of some maleated polyolefins. The process according to the present invention in step (I) is preferably conducted in a continuous process in a continuous reactor. Suitable examples of continuous reactors include screw extruders and stirred reactors with twin screw extruders being most preferred.

In the process according to the present invention of producing the urea derivative of succinylated polyolefins, urea or an aqueous solution of urea is mixed slowly with a molten maleated polyolefin (succinylated polyolefin) at a temperature above the melting point of the polyolefin in either batchwise or continuous mode for sufficient time to yield the molten derivative and water vapor. The cooled solid product can be used as is, or formed into an emulsion which can be incorporated into other products.

Once the urea derivative of succinylated polyolefins is produced, it can be used as is or formed into an emulsion as described. The usefulness of this product is as a coupling agent and is formed into a coupled composition. The recovered urea derivative of succinylated polyolefins is coupled with a polymer having an excess of unreacted acid groups. Suitable examples of these include polyesters, polycarbonates, polyacrylic acids, and nylon. This coupling reaction process entails acid/base chemistry.

The formation of an emulsion from the urea derivative of succinylated polyolefins is preferably conducted at a temperature of about 160° to about 180° C., at neutral or basic pH at a concentration of about 10 to 30 weight percent with a minor amount up to 15 weight percent surfactant with the remainder being water.

This emulsion is preferably used to couple the urea derivative of succinylated polyolefin with an additional polymer introduced into the emulsion to produce the coupled composition.

The temperature producing the emulsion is between 160° and 180° C., preferably 165° to 178° C. with a temperature of about 170° to 175° C. being most preferred. The emulsion composition according to the present invention can be prepared at neutral or basic pH. However, it is preferred that the pH be between 7 and 10, more preferably between 9 and 10 with a pH of about 9.5 to 9.7 being most preferred.

EXAMPLES

The following examples are intended to illustrate the present invention but should not be interpreted as a limitation thereon.

Example 1

Batchwise Process

Epolene E43 at 2,000 g (containing 1.6 equiv. of acid anhydride group), a maleated crystalline polypropylene wax from Eastman Chemical Company (ECC) having a RBSP (Ring and Ball Softening Point) of 155° C.; an acid number of 47; a melt viscosity of about 350 cP at 190° C., and 200 ml. of xylene were placed in a resin kettle and heated until the xylene refluxed. A solution of 96 g. (1.6 equiv.) of urea in 192 ml of water was added dropwise. During this addition water, xylene, and a trace of other volatiles distilled into a Dean/Stark trap where the water phase was drained away and discarded. After all the water had distilled the mixture was heated further so that all the xylene was distilled, drained away, and discarded. In order to remove all traces of volatiles a rapid stream of nitrogen was used to strip volatiles for an additional 0.5 hr. at 180° C. The molten product cooled to a hard solid having the following properties: a RBSP of 159.2° C.; a melt viscosity of 778 cP at 190° C.; an acid number of 30; and peaks in the infrared spectrum at 3199, 1771, 1714, 1670 cm-1.

Example 2

Continuous Process

The above product was also prepared on a twin screw extruder (rate=10 lb. (4.5 kg) per hour) by first mixing the same ratio of Epolene E43 with urea and then introducing this mixture into the throat of the extruder at 180° C.

The melt viscosity of this product from the screw extruder did not change during a 7 hour period at 190° C. in air, indicating high thermal stability. In addition, the infrared spectrum of the product after the 7 hour period was unaltered from that obtained prior to heating. These results show that a product comparable to that produced in Example 1 can be prepared continuously.

Example 3

The above batchwise process of Example 1 was repeated using a maleated amorphous polypropylene (MAPP) instead of Epolene E43. This material had an acid number of 60 and a melt viscosity near 2000 cP at 190° C. The MAPP was prepared in a continuous reactor from P1023 (an amorphous polypropylene from ECC) at 200° C. with a residence time of about 20 minutes. The urea derivative had the following properties: a RBSP of 157.2° C.; a melt viscosity of 3700 cP at 190° C.; an acid number of 13.7; and an infrared spectrum like that above in Example 1.

Example 4

Maleated Epolene N14, a crystalling polyethylene wax having an acid number of 28.6 (0.25 equiv. of anhydride), a melt viscosity of 390 cP at 125° C.; and a RBSP of 103° C. at 500 go was heated to 180° C. and maintained under nitrogen. Maleated Epolene N14 was prepared in a continuous reactor from Epolene N14 (from ECC) at 160° C. with a residence time of about 20 minutes. To this molten wax was added 16 g. of urea dissolved in 32 g. of water. During the urea addition period, over 31 g. of water was collected in the Dean/Stark trap and discarded. After an additional 0.5 hour at 180° C. the tan product was cooled and analyzed. The product had the following properties: a RBSP of 103.3° C.; a melt viscosity of 539 cP at 125° C. (unchanged after an additional hour at 125° C.); and infrared spectrum peaks as above in Example 1.

Example 5 (Comparative)

Epolene E43 from Example 1 at 500 g., (0.4 equivalent of anhydride group) was added to an extruder along with 6 g. (0.1 equivalent) of ethylene diamine at 180° C. at a rate of 10 lb. per hour. The melt viscosity of the product was 7500 cP at 190° C.

Example 6 (Comparative)

The experiment of Example 5 was repeated with 8 g. (0.33 equivalent) of ethylene diamine, the product was an intractable solid.

I claim:

1. A composition comprising the urea derivative of succinylated polyolefins of the formula;

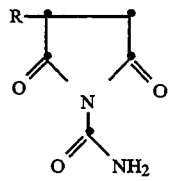

wherein R is a polyolefin attached at any point along the hydrocarbon chain.

2. The composition according to claim 1 wherein the succinylated polyolefin used to form the urea derivative of succinylated polyolefins is selected from the group consisting of maleated polypropylene and maleated polyethylene.

3. The composition according to claim 2 wherein said succinylated polyolefin is a maleated polypropylene wax with a viscosity less than 2,000 cP at 190° C.

4. The composition according to claim 2 wherein said succinylated polyolefin is a maleated amorphous polypropylene with a melt viscosity of less than 10,000 cP at 190° C.

5. The composition according to claim 2 wherein said succinylated polyolefin is selected from the group consisting of maleated homopolypropylene; maleated homopolyethylene; maleated copolymers of propylene and up to 50 weight percent of at least one other olefin selected from the group consisting of ethylene, butene, hexene, and mixtures thereof; and maleated copolymers of ethylene and up to 50 weight percent of at least one other olefin selected from the group consisting of propylene, butene, hexene, and mixtures thereof.

* * * * *